United States Patent [19]

Jolly

[11] Patent Number: 4,626,166
[45] Date of Patent: Dec. 2, 1986

[54] METHOD FOR THE PLACEMENT OF A TRAILER-MOUNTED SAND HOPPER

[76] Inventor: Arthur E. Jolly, P.O. Box 1146, Victoria, Tex. 77902

[21] Appl. No.: 795,631

[22] Filed: Nov. 6, 1985

[51] Int. Cl.$^4$ ............................................. B60P 1/64
[52] U.S. Cl. ............................. 414/786; 52/122.1; 52/143; 52/194; 52/197; 298/19 R; 414/469; 414/919; 414/483; 414/23; 414/500; 414/473
[58] Field of Search ............... 414/919, 482, 569, 500, 414/494, 495, 332, 435, 680, 434, 436, 473, 481, 482, 483, 469, 10, 12, 23, 786; 52/116, 122.1, 143, 194, 197; 298/19 R

[56] References Cited

U.S. PATENT DOCUMENTS

| | | | |
|---|---|---|---|
| 3,112,037 | 11/1963 | Thiermann | 414/23 |
| 3,154,200 | 10/1964 | Versch et al. | 414/23 |
| 3,292,320 | 12/1966 | Laharty | 414/23 X |
| 3,448,866 | 6/1969 | Perry et al. | 414/919 X |
| 3,455,475 | 7/1969 | Suteau | 414/919 X |
| 3,618,801 | 11/1971 | Blanchard | 414/483 |
| 3,985,254 | 10/1976 | Grandury | 414/919 X |
| 4,163,626 | 8/1979 | Batterton et al. | 414/919 X |

FOREIGN PATENT DOCUMENTS

| | | | |
|---|---|---|---|
| H 16212 | 5/1956 | Fed. Rep. of Germany | 414/481 |
| 2808777 | 9/1979 | Fed. Rep. of Germany | 414/919 |
| 3329412 | 2/1985 | Fed. Rep. of Germany | 414/919 |
| 2409952 | 7/1979 | France | 414/332 |
| 2436088 | 5/1980 | France | 414/919 |
| 646865 | 10/1962 | Italy | 414/23 |

Primary Examiner—Frank E. Werner
Attorney, Agent, or Firm—Gunn, Lee & Jackson

[57] ABSTRACT

A trailer-mounted sand hopper having a trailer pivotally mountable at the front end of a motor-driven truck. The sand hopper is tiltably mounted on the rear portion of the trailer and is releasably secured to the rear portion of the trailer. The hopper is capable of being tilted to vertical and horizontal positions with respect to the trailer by engagement of a winch and cable system. The hopper is provided with backing plates which facilitate the engagement and disengagement of the hopper from the trailer.

1 Claim, 9 Drawing Figures

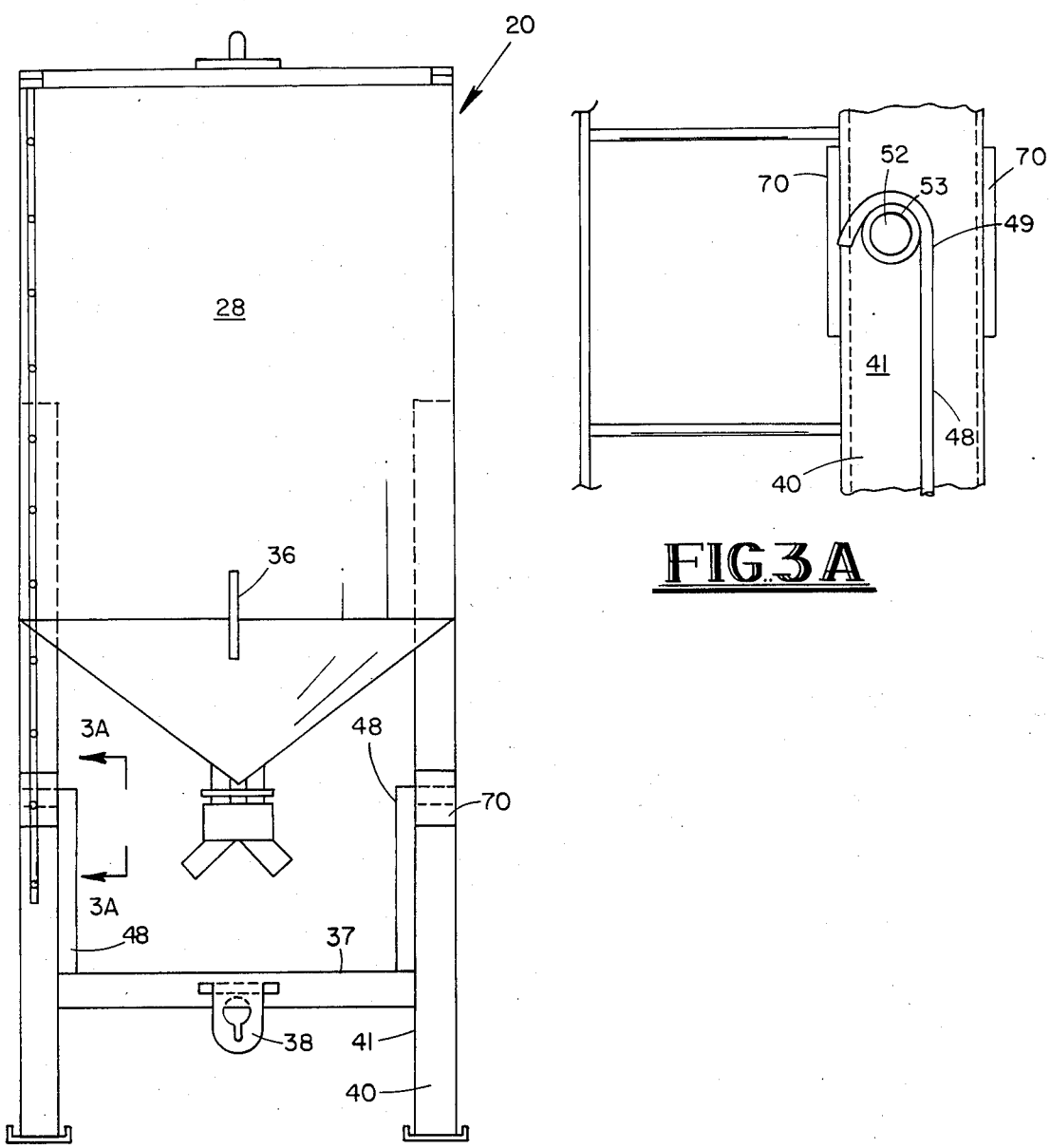

METHOD FOR THE PLACEMENT OF A TRAILER-MOUNTED SAND HOPPER

BACKGROUND OF THE INVENTION

This invention relates to a trailer-mounted sand hopper and is particularly useful for transporting the sand hoppers to isolated construction sites without necessitating the use of specialized rigging or lifting equipment.

Large sand hoppers for storage of sand for use in delivering sand for making concrete are currently transported to construction sites on flatbed trailers. They are generally transported in the upright or vertical position and are lifted from the trailer by means of a crane or cherry picker. The transporting trailer is moved into the proximate location for placement of the sand hopper. The crane then lifts the sand hopper from the flatbed trailer and places it in its final location on the construction site.

Thus, existing methods require the utilization of a separate crane and entail considerable hours of labor to position the sand hopper at the construction site. Additionally, more personnel are necessary to facilitate the removal of the hopper from the flatbed trailer. There must be a driver for the truck transporting the hopper on the trailer, there must be a crane operator, and at least two safety personnel during the rigging and removal procedure.

The advantages of the present invention enable the sand hopper to be placed at a specified location at the construction site by two men in three and one-half minutes or less. There is no need for a crane and all the extra equipment associated with the previous devices and methods for unloading the sand hopper.

SUMMARY OF THE INVENTION

The present invention provides a trailer-mounted sand hopper which is tiltably mounted on the rear portion of a trailer. The trailer is pivotally mountable at the front end to a motor-driven truck. The hopper is releasably secured to the rear portion of the trailer. A means for tilting the hopper from its transported horizontal position to the upright vertical placement position is connected to the trailer and is capable of pulling the sand hopper into the upright position. Once the sand hopper has been placed in the upright position, the hopper is disengaged from the trailer and may stand alone at the construction site. The trailer and truck may then be removed from the construction site. When the sand hopper is to be relocated, the truck and trailer are positioned for engagement with the sand hopper and the operation previously mentioned is reversed. It is even possible that the same sand hopper may be moved to a number of job sites within any given working day, thus reducing the overall equipment requirements of the contractor.

BRIEF DESCRIPTION OF THE DRAWINGS

FIG. 3 is a front view of the sand hopper of the present invention.

FIG. 3A is a view along lines A—A of FIG. 3 illustrating the backing plates of the present invention.

DETAILED DESCRIPTION OF THE PREFERRED EMBODIMENT

Figure 1A:
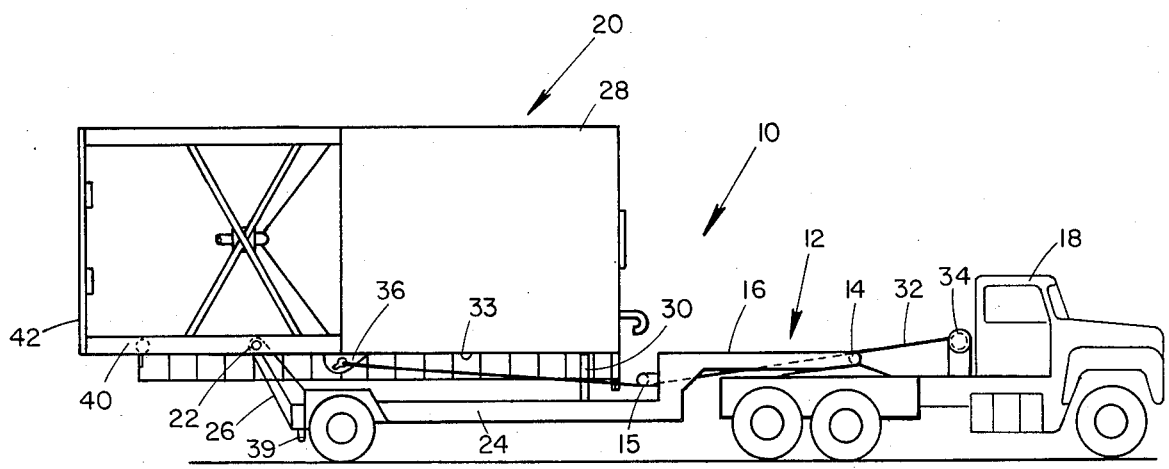
FIGS. 1A through 1E illustrate the steps of the present inventive method for dispositioning the sand hopper of the present invention.

Referring to FIG. 1A, the numeral 10 designates the sand hopper trailer combination of the present invention. Trailer 12 is pivotally mounted at pivot point 14 located on the front portion 16 of trailer 12 to motor-driven truck 18. Sand hopper 20 is pivotally mounted to trailer 12 about pivot points 22 on both sides of trailer 12. Pivot points 22 extend beyond the base 24 of trailer 12. Risers 26 extend from the end of base 24 upwardly and rearwardly from each side of trailer 12 terminating at pivot points 22. The upper portion 28 of hopper 20 rests upon hopper support member 30 which is rigidly secured to base 24 of trailer 12.

As can be seen in FIG. 1A hopper 20 is transported to and from construction sites in the horizontal position. This enables the hopper-trailer combination to have an overall lower height, thereby reducing traffic and highway problems during transport. During transport this horizontal position is maintained by connecting cable 32 from winch 34 to tongue member 36 which is welded to the front 33 of the hopper 20 at a generally midpoint position relative to the overall height and width of the hopper 20.

During transport, cable 32 extends beneath roller 15 and attachs to tongue member 36 and is tensioned so as to hold hopper 20 in the horizontal position.

Figure 1B:
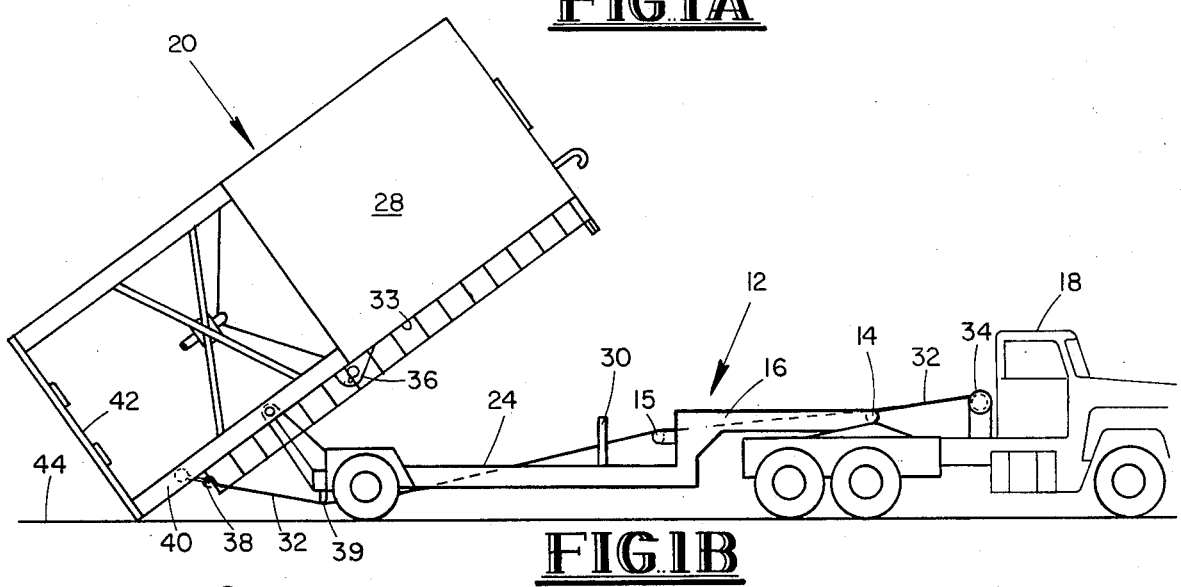

In FIG. 1B hopper 20 has been partially tilted toward the upright position. Cable 32 has been moved from tongue member 36 over roller 15 and under roller 39 to hinge member 38. Hinge member 38 is centrally positioned on cross member 37 between the two front legs 40 of hopper 20. Roller 39 extends across the width of trailer 12 beneath base 24. In FIG. 1B, cable 32 has been pulled via winch 34 so that hopper base member 42 has just touched the ground 44 and hopper 20 is approaching the upright position.

During the operation illustrated in FIG. 1B, the motor-driven truck 18 engages its braking system to maintain the truck 18 and trailer 12 in a fixed position. As hopper base member 42 touches the ground 44, tension continues to be applied to cable 32 as it passes under roller 39 positioned at the rear of and beneath trailer base 24. The operator of truck 18 slowly releases the vehicle brake and allows the truck 18 to shift backward from its fixed position. Hopper 20 continues to move into the upright position. Ultimately, the hopper becomes fully vertical as shown in FIG. 1C.

Figure 1C:
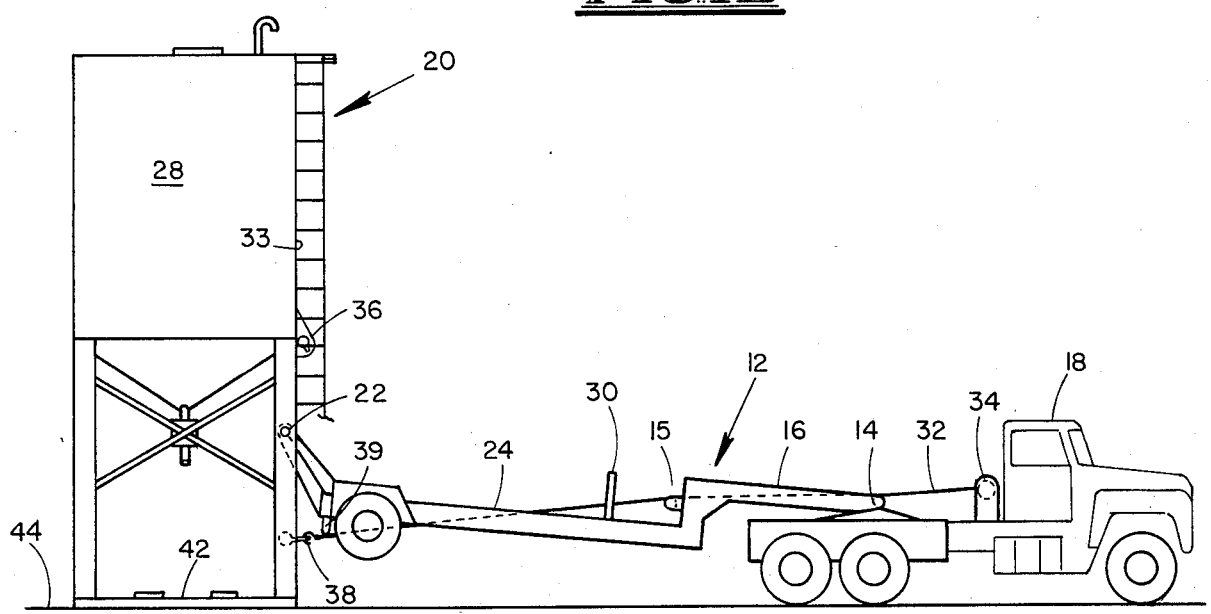

Because the truck 18 is allowed to gradually move back toward the hopper 20 as it becomes upright, trailer 12 is lifted above the ground 44 as shown in FIG. 1C. Cable 32 passing under roller 39 and being connected to hinge member 38 is next provided with slack by reversing the action of winch 34. When sufficient slack is provided in cable 32, it is disconnected from hinge member 38 and connected to tongue member 36, still passing beneath roller 39. Because pivot points 22 detachably secure trailer 12 to hopper 20, as will be discussed below, removal of cable 32 from hinge member 38, once the hopper is in the upright position, creates no safety hazards. Trailer 12 is fully supported above the ground by the connection at pivot points 22 on each side of trailer 12.

Figure 1D:
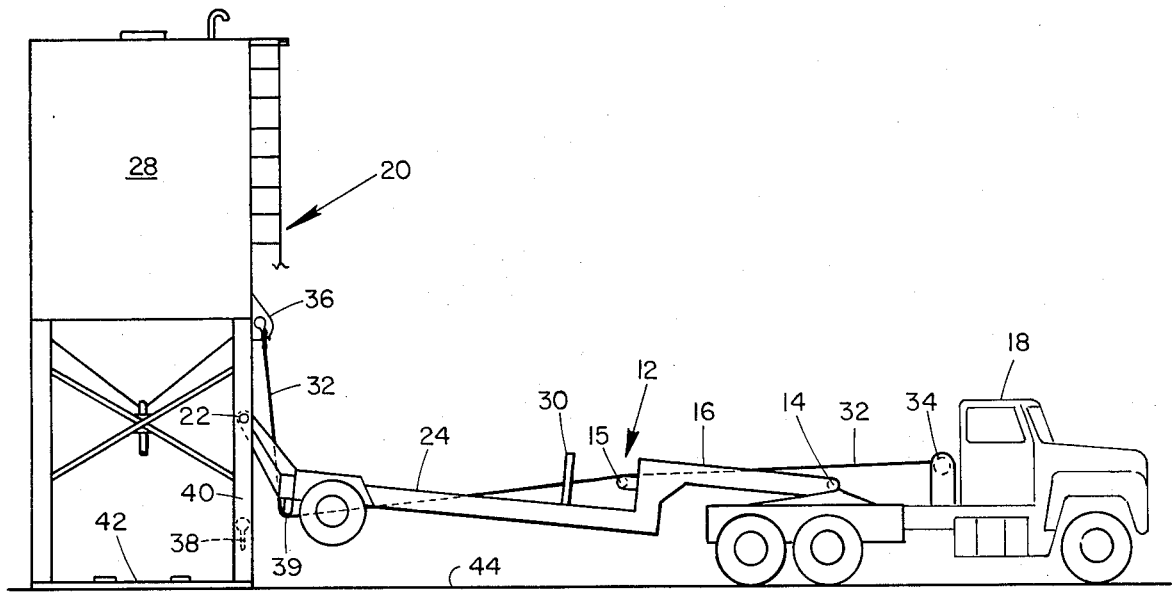
Figure 1E:
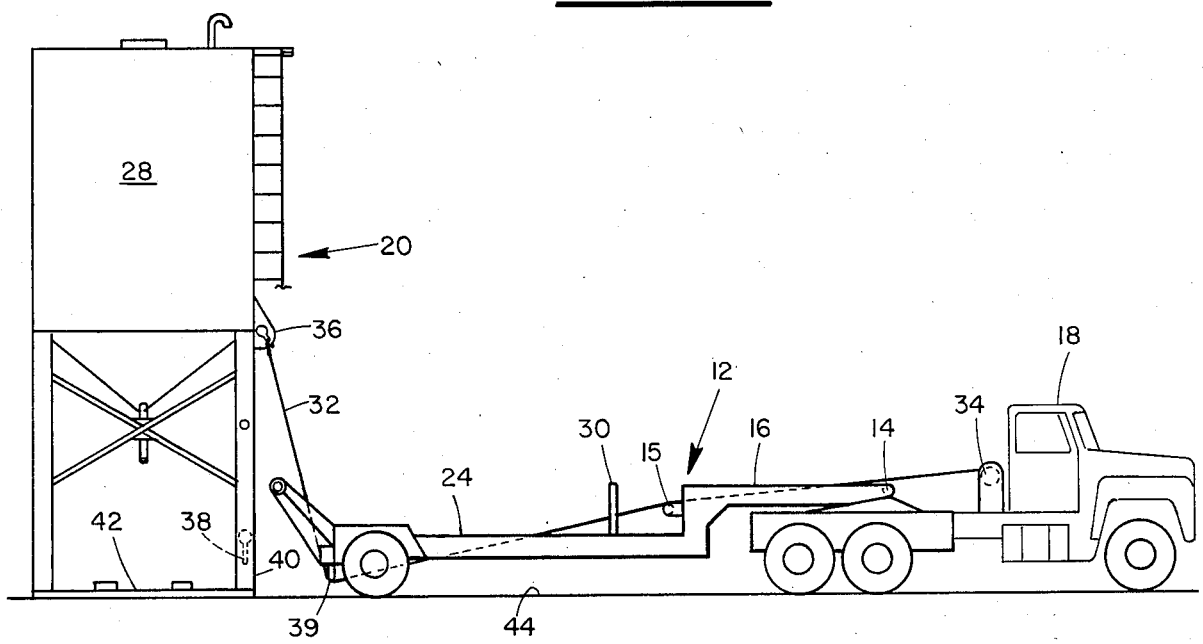

FIG. 1D illustrates cable 32 being connected to tongue member 36 and passing beneath roller 39. At this point winch 34 is engaged, creating tension on cable 32. By creating tension on cable 32, the weight of trailer 12 is removed from the pivot points 22. Once the weight is removed from pivot points 22, connection members 46 (see FIGS. 2A and 2B) may be withdrawn, allowing the hopper 20 to be disconnected from the trailer 12 to enable trailer 12 to be subsequently lowered to the ground 44. After connection members 46 are removed, the action of winch 34 is reversed and cable 32 is fed out, allowing trailer 12 to be lowered to the ground 44. Once the trailer 12 is on the ground, additional slack is provided in cable 32 and cable 32 is then disconnected from tongue member 36. FIG. 1E illustrates trailer 12 on the ground 44 with cable 32 still attached to tongue member 36.

As can be seen from the foregoing, sand hopper 20 may be positioned at any location on the construction site without the need for utilizing cranes or cherry pickers. Further, the only personnel needed for the placement of sand hopper 20 are the vehicle operator and an additional man to move cable 32 from its initial location at the tongue member 36 to hinge member 38 and back to tongue member 36 when the trailer is to be ultimately lowered to the ground 44. This second worker also removes the connection members 46 to allow the hopper 20 to be disengaged from trailer 12.

When hopper 20 is to be moved to another location, truck 18 with trailer 12 is backed up to hopper 20. In order to position the trailer for proper engagement with hopper 20, backing plates (shown in FIG. 3) are rigidly affixed to each of the front legs 40 of hopper 20. When the trailer 12 contacts backing plates 48, then the trailer is brought to a stop. The operator knows that the pivot points 22 are in position for engagement to hopper 20 when contact is made with plates 48.

Cable 32 is extended from winch 34 over roller 15, under roller 39, and connected to tongue member 36. When winch 34 is engaged, cable 32 is tensioned and begins to pull trailer 12 up to pivot points 22. The operator allows the truck to move back slightly so that pivot points 22 may be aligned and connection members 46 inserted to engage trailer 12 with hopper 20.

Once connection members 46 are engaged, cable 32 may be disconnected from tongue member 36 and engaged in hinge member 38. The operator gradually pulls truck 18 forward while allowing cable 32 to feed out until trailer 12 touches the ground 44. As the trailer touches the ground 44, the operator then allows winch 34 to gradually feed out cable, allowing hopper 20 to lower onto trailer 12. Because hopper 20 pivots about pivot points 22 which are lower than the hopper's center of gravity, the weight of hopper 20, once it is tilted forward, will cause the hopper 20 to lower. Cable 32 and winch 34 are used to control the downward movement of hopper 20. When hopper 20 contacts support member 30 on trailer 12, hopper 20 is in position for movement to a new location.

Figure 2A:
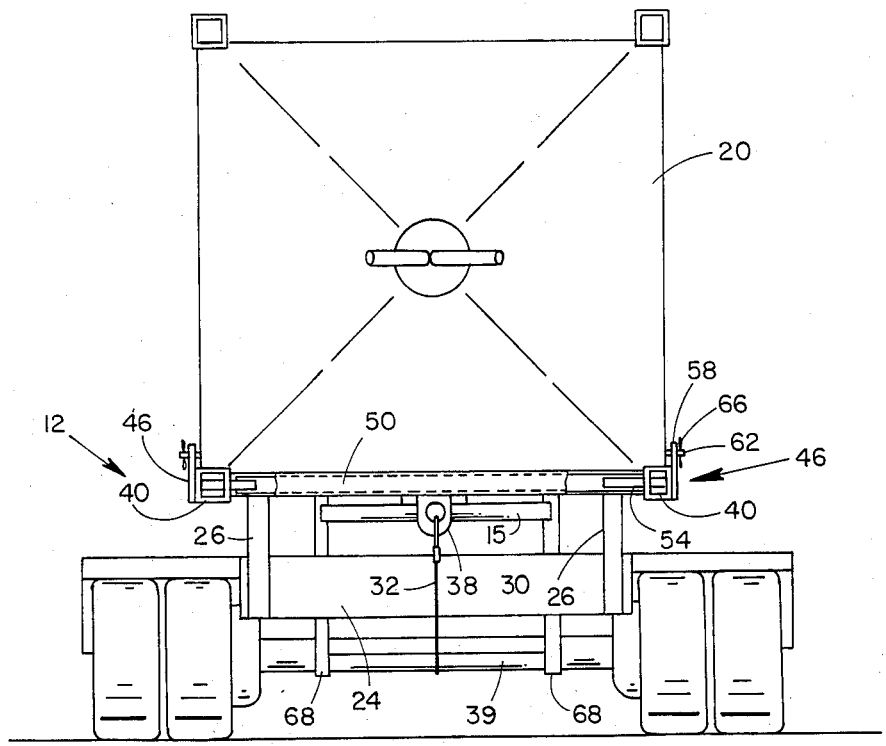
FIG. 2A illustrates a rear view of the trailer and sand hopper combination of the present invention.

FIG. 2A shows a rear view of the hopper-trailer combination 10. In FIG. 2A hopper 20 is in the horizontal position on trailer 12. Hopper support member 30 supports the front position of hopper 20. Risers 26 are spaced on either side of trailer 12 and rise upwardly and rearwardly from the base 24 of trailer 12. Bridging member 50 connected to the upper inside of risers 26 spans the space between risers 26 and serves as the cantilever pivot when the hopper is tilted.

As can be seen in FIG. 2A front legs 40 of hopper 20 are bored to receive connection members 46 which pass through legs 40 and into bores in the cantilevered bridging member 50 affixed the top of risers 26.

Figure 2B:
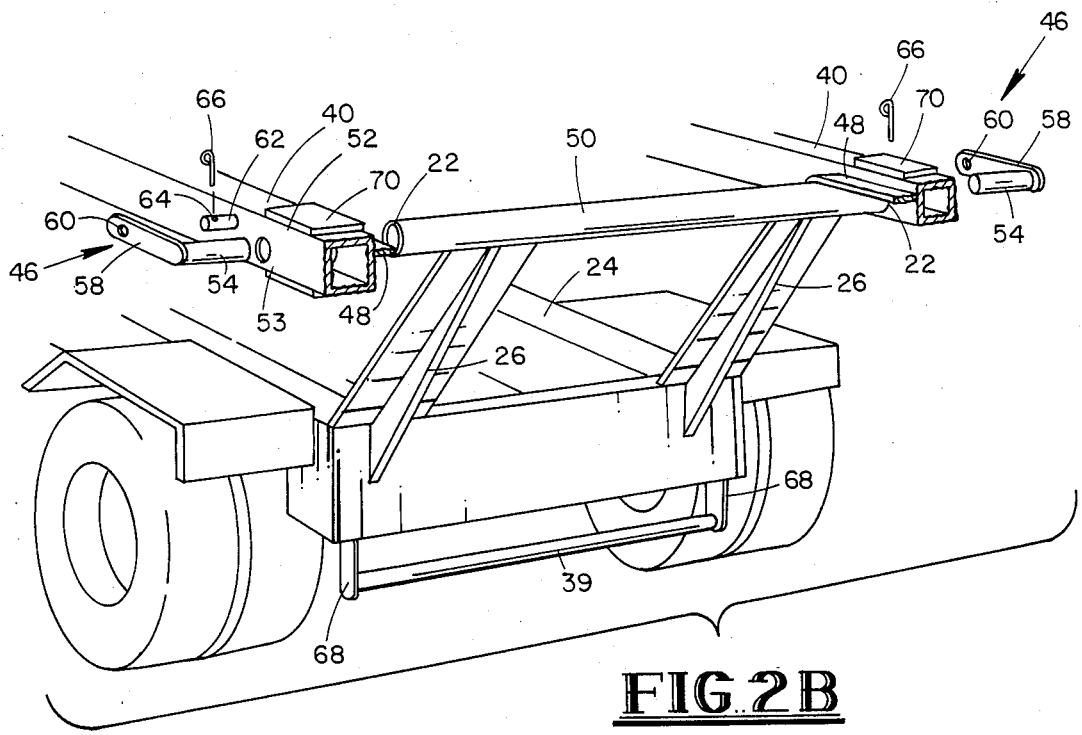
FIG. 2B is an exploded prospective view of the rear of the trailer of the invention and the details of the pivot point of the invention.

FIG. 2B further illustrates the construction and interrelationship of the parts associated with the pivot points 22. In FIG. 2B one of the two parallel spaced front legs 40 of hopper 20 is shown with bore 52. A similar bore is on the other front leg of hopper 20, but is not shown in FIG. 2B. Bore 52 passes completely through the tubular steel leg 40. A sleeve bearing surface 53 is provided within bore 52. Bore 52 is sized to receive the male portion 54 of connecting member 46. Transverse bridging member 50, connected to the top of risers 26 and spanning from one riser to the other, has on each end thereof a connection bore 56. When bore 52 in leg 40 is brought into alignment with bore 56 in bridging member 50, then connection member 46 will pass through bores 52 and 56, connecting the hopper 20 with the trailer 12. There is sufficient clearance between male member 54 and bores 52 and 56 to allow the rotation of hopper 20.

Connection member 46 has a leg 58 which is attached to the end of male member 54 and extends perpendicular to the male member 54. Leg 58 has a bore 60 therein for receiving lug 62 attached to leg 40. When connection member 46 is engaged through bores 52 and 56, bore 60 is aligned with lug 62, allowing lug 62 to pass through bore 60. Lug 62 is adapted with a small bore 64 for receiving lock pin 66. By engaging connection member 46 to lug 62 via bore 60 and inserting lock pin 66 through bore 64, connection member 46 is securely affixed to hopper 20 to achieve the detachable engagement of hopper 20 to trailer 12. As can be further seen in FIG. 2B, roller 39 is connected at each end to legs 68 which extend downwardly from the base 24 of trailer 12.

FIG. 3 shows a front view of hopper 20. Front legs 40 have securely affixed to their inner side 41 backing plates 48. These backing plates 48 extend from the top of bore 52 to the top of cross member 37. Cross member 37 is a tubular steel pipe extending between the two front legs of hopper 20 and securely affixed to the inner side 41 of legs 40. Positioned on cross member 37 at a location generally central to the cross member 37 is hinge 38. Hinge 38 is pivotally mounted on cross member 37 by any conventional method known.

As can be further seen from FIG. 3, both the front side and back side of legs 40 are provided with stiffener plates 70. Stiffener plates 70 are welded to legs 40 to strength the tubular steel leg where bores 52 pass through legs 40. The relationship between backing plate 48, the stiffener plate 70, and bore 52 for one leg 40 can be more completely seen in FIG. 3A. FIG. 3A illustrates a view of the inside of one leg 40. In this FIG. 3A backing plate 48 is shown as being arcuated at its upper portion 49 around bore 52. Bore 52 has within it a tubular sleeve bearing 53.

Stiffener plates 70 can be seen in FIG. 3A as being welded to the front and back sides of leg 40 so that they extend above and below bore 52. These stiffener plates provide additional structural strength to legs 40 during tilting operations of hopper 20.

While the hopper-trailer combination and method for using the same have been described in connection with the preferred embodiment, it is not intended to limit the invention to the particular form set forth; but on the contrary, it is intended to cover such alternatives, modifications, and equivalents as may be included in the spirit and scope of the invention as defined by the appended claims.

I claim:

1. A method for placing a bulk sand hopper at a specified location comprising:
   transporting said hopper horizontally to said specified location on a trailer pivotally mounted at a front end to a motor-driven truck;
   attaching a winch and cable system, cooperative with said trailer, to a tilting hinge member on a lower portion of said hopper, said hopper being tiltably attached to a rear portion of said trailer;
   engaging said winch and cable system in a first direction to tilt said hopper to a generally vertical position whereby front legs of said hopper contact the ground at said specified location, said hopper rotating about pivot points on said trailer to which said hopper is tiltably attached;
   backing said truck while said hopper comes to a full upright position at said location, said rear portion of said trailer simultaneously being lifted above said ground at said location while rotating about said pivot points;
   detaching said winch and cable system from said hinge member and subsequently attaching said system to a tongue member connected to said hopper above said pivots points;
   removing connection members from said pivot points to disengage said trailer from said hopper;
   engaging said winch and cable system in a second and opposite direction to lower said trailer to said ground at said specified location;
   disconnecting said system from said tongue member after said trailer is fully upon said ground.

* * * * *